US009578030B2

United States Patent
Lavi (10) Patent No.: US 9,578,030 B2
(45) Date of Patent: *Feb. 21, 2017

(54) METHOD AND SYSTEM FOR ANALYZING SECURITY RULESET BY GENERATING A LOGICALLY EQUIVALENT SECURITY RULE-SET

(71) Applicant: Tufin Software Technologies Ltd., Ramat Gan (IL)

(72) Inventor: Yoni Lavi, Ra'anana (IL)

(73) Assignee: TUFIN SOFTWARE TECHNOLOGIES LTD., Ramat Gan (IL)

( * ) Notice: Subject to any disclaimer, the term of this patent is extended or adjusted under 35 U.S.C. 154(b) by 181 days.

This patent is subject to a terminal disclaimer.

(21) Appl. No.: 14/328,028

(22) Filed: Jul. 10, 2014

(65) Prior Publication Data

US 2014/0325590 A1 Oct. 30, 2014

Related U.S. Application Data

(63) Continuation-in-part of application No. 13/367,795, filed on Feb. 7, 2012, now Pat. No. 8,806,569.

(60) Provisional application No. 61/440,076, filed on Feb. 7, 2011.

(51) Int. Cl.
*H04L 29/06* (2006.01)
*G06F 21/00* (2013.01)
*G06F 21/60* (2013.01)

(52) U.S. Cl.
CPC .............. *H04L 63/10* (2013.01); *G06F 21/604* (2013.01); *H04L 63/0263* (2013.01)

(58) Field of Classification Search
CPC ..... H04L 63/0263; H04L 63/10; G06F 21/604
See application file for complete search history.

(56) References Cited

U.S. PATENT DOCUMENTS

| 5,475,817 A | 12/1995 | Waldo et al. |
| 6,202,066 B1 | 3/2001 | Barkley et al. |
| 6,564,037 B1 | 5/2003 | Sweatman et al. |

(Continued)

OTHER PUBLICATIONS

Birget, Jean-Camille, et al., "Hierarchy-based access control in distributed environments", IEEE International Conference on Communications (ICC 2001), vol. 1, pp. 229-233. Copyright IEEE, 2001.*

(Continued)

*Primary Examiner* — Jung Kim
*Assistant Examiner* — Christopher Ruprecht
(74) *Attorney, Agent, or Firm* — Browdy and Neimark, PLLC (57) ABSTRACT

There are provided a rule-set analyzer and a method of analyzing an ordered security rule-set comprising a plurality of rules and characterized by at least one extrinsic field. The method comprises: upon specifying atomic elements constituting an extrinsic space corresponding to the at least one extrinsic field, partitioning, by a processor, the extrinsic space into two or more equivalence classes, wherein each atomic element in the extrinsic space belongs to one and only one equivalence class; mapping, by the processor, said equivalence classes over the rule-set; and analyzing, by the processor, the security rule-set using the results of mapping said equivalence classes over the rule-set.

12 Claims, 3 Drawing Sheets

(56) References Cited

U.S. PATENT DOCUMENTS

| | | |
|---|---|---|
| 6,772,350 B1 | 8/2004 | Belani et al. |
| 6,778,530 B1 | 8/2004 | Greene |
| 6,826,698 B1* | 11/2004 | Minkin ............... H04L 63/0263 709/223 |
| 7,100,195 B1 | 8/2006 | Underwood |
| 7,137,104 B2 | 11/2006 | Tip et al. |
| 7,185,192 B1 | 2/2007 | Kahn |
| 7,219,234 B1 | 5/2007 | Ashland et al. |
| 7,783,735 B1 | 8/2010 | Sebes et al. |
| 8,065,712 B1 | 11/2011 | Cheng et al. |
| 8,380,981 B2 | 2/2013 | Beckwith |
| 2003/0023587 A1 | 1/2003 | Dennis et al. |
| 2003/0078932 A1 | 4/2003 | Kaiserwerth et al. |
| 2003/0229623 A1 | 12/2003 | Chang et al. |
| 2004/0153941 A1 | 8/2004 | Muratani |
| 2004/0225893 A1 | 11/2004 | Ng |
| 2004/0267865 A1 | 12/2004 | Cuervo |
| 2005/0132054 A1 | 6/2005 | Chang et al. |
| 2005/0289150 A1 | 12/2005 | Kudo |
| 2006/0150238 A1* | 7/2006 | D'Agostino .......... H04L 63/102 726/1 |
| 2006/0230043 A1 | 10/2006 | Sumner-Moore |
| 2007/0118893 A1 | 5/2007 | Crawford |
| 2008/0037539 A1 | 2/2008 | Paramaguru |
| 2008/0066151 A1 | 3/2008 | Thomsen et al. |
| 2008/0127327 A1 | 5/2008 | Carrasco |
| 2008/0276311 A1 | 11/2008 | Kassovic |
| 2008/0289000 A1 | 11/2008 | Young et al. |
| 2008/0301765 A1* | 12/2008 | Nicol ................... H04L 41/142 726/1 |
| 2009/0028047 A1 | 1/2009 | Schmidt et al. |
| 2009/0138938 A1 | 5/2009 | Harrison et al. |
| 2009/0147307 A1 | 6/2009 | Dietrich et al. |
| 2009/0183228 A1 | 7/2009 | Dasch et al. |
| 2009/0287933 A1 | 11/2009 | Beckwith et al. |
| 2010/0011433 A1 | 1/2010 | Harrison et al. |
| 2010/0037289 A1* | 2/2010 | Roy ..................... G06F 21/604 726/1 |
| 2010/0125891 A1 | 5/2010 | Baskaran |
| 2010/0161960 A1 | 6/2010 | Sadasivan |
| 2010/0174686 A1* | 7/2010 | Acharya ........... G06F 17/30864 707/690 |
| 2010/0186062 A1 | 7/2010 | Banti et al. |
| 2010/0199346 A1* | 8/2010 | Ling ................... H04L 63/0263 726/12 |
| 2010/0257576 A1 | 10/2010 | Valente et al. |
| 2010/0299741 A1* | 11/2010 | Harrison ............. H04L 63/0281 726/12 |
| 2011/0060713 A1* | 3/2011 | Harrison ............... G06F 21/604 706/47 |
| 2011/0225646 A1 | 9/2011 | Crawford |
| 2011/0258656 A1 | 10/2011 | Michel |
| 2011/0282771 A1 | 11/2011 | Reich et al. |
| 2012/0089745 A1 | 4/2012 | Turakhia |
| 2012/0124643 A1* | 5/2012 | Moriconi ................ H04L 63/20 726/1 |
| 2012/0180104 A1* | 7/2012 | Gronich ................. H04L 63/20 726/1 |
| 2012/0192246 A1* | 7/2012 | Harrison ............... G06F 21/577 726/1 |
| 2012/0233670 A1* | 9/2012 | Bonnes ................ G06F 21/604 726/4 |
| 2013/0031619 A1 | 1/2013 | Waltermann et al. |

OTHER PUBLICATIONS

Frank, Mario, et al., "A Class of Probabilistic Models for Role Engineering", Proceedings of the 15th ACM Conference on Computer and Communications Security (CCS'08), pp. 299-310, Oct. 27-31, 2008, Alexandria, Virginia, USA. Copyright 2008 ACM.*

Benson, Theophilus et al., "Mining Policies From Enterprise Network Configuration", IMC'09, Nov. 4-6, 2009, Chicago, Illinois, USA.

* cited by examiner

METHOD AND SYSTEM FOR ANALYZING SECURITY RULESET BY GENERATING A LOGICALLY EQUIVALENT SECURITY RULE-SET

CROSS-REFERENCES TO RELATED APPLICATIONS

The present application is continuation-in-part of US application US2012/0204220 claiming priority from U.S. Provisional Patent Application No. 61/440,076 filed on Feb. 7, 2011. The entire contents of both applications are incorporated herein by reference.

FIELD OF THE INVENTION

This invention generally relates to network security, and more particularly, to systems of analyzing a security rule-set and methods of operating thereof.

BACKGROUND OF THE INVENTION

Today, information security is one of the critical concerns in computer networks and services. Various methods have been developed for protection of various resources and services; usually these methods include implementation of one or more security policies, combinations and hierarchies thereof. A security policy typically includes control of inbound and outbound traffic related to certain resources. Such control can be enforced with the help of a security gateway. Functions of the security gateway can be implemented fully or partly at various network devices (e.g. switches, routers, firewalls, VPN devices, load balancers, combinations thereof, etc.) and/or fully or partly implemented in the platforms accommodating these certain resources.

In addition to controlling traffic in accordance with source, destination and/or services, the security gateways are now evolving into a new generation that adds to the security policy two new dimensions, users and applications. Alternatively, the security gateways can provide control of access to certain resources in accordance with user and/or application independently of control based on source, destination and/or services characteristics of the traffic.

The problem of user/application based control has been recognized in the Prior Art and various systems have been developed to provide a solution, for example:

U.S. Pat. No. 6,772,350 (Belani et al.) discloses a distributed access controller for controlling access to resources in a multi-domain distributed computing environment. The access controller is configured to receive a request from a user requesting performance of one or more operations on a particular resource. The access controller attempts to resolve the requested operations based on user hierarchy information and access list information for the particular resource. If all the operations in the user's request cannot be resolved based on the user hierarchy information and the access list information for the particular resource, the access controller then attempts to resolve the unresolved operations based on the particular user's user hierarchy information in combination with resource hierarchy information, and access list information for the resources in the resource hierarchy information. In alternate embodiments, the access controller attempts to resolve the requested operations based on the resource hierarchy information and access list information for the resources in the resource hierarchy information. If all the operations in the user's request cannot be resolved based on the resource hierarchy information and the access list information for the resources in the resource hierarchy information, the access controller then attempts to resolve the unresolved operations based on the resource hierarchy information in combination with the particular user's user hierarchy information, and the access list information for the resources in the resource hierarchy information.

US Patent Application No. 2005/132054 (Chang et al.) discloses methods, systems, and media for determining access rights to a resource managed by an application. One embodiment includes receiving a request by the application, wherein the request comprises an action a user seeks to perform on the resource, and locating, based on the request, the resource in both a containment relationship graph and in a structure having groupings of resources, wherein the groupings comprise a grouping having the resource. Further, the embodiment includes traversing a vertex of the containment relationship graph, wherein the vertex comprises a generational resource of the resource, and reading an authorization table associated with a grouping having the generational resource in the groupings. Further still, the embodiment includes determining whether to grant the access rights for performing the action on the resource.

U.S. Pat. No. 7,219,234 (Ashland et al.) discloses a system and method for managing system-level privileges and for granting access rights to system resources within a data processing system. System-level privileges are assigned directly to individual users. In contrast, access rights are assigned to individual users and/or to groups of users using data constructs known as Access Control Records (ACRs). Each ACR associates one or more user groups and/or one or more individual users with a set of access rights. A system resource is then associated with an ACR. The users identified within the associated ACR are thereby granted access to the object using the access rights specified by the ACR. An ACR may define multiple sets of access rights, with each set of access rights being associated with one or more user groups and/or one or more individual users.

SUMMARY OF THE INVENTION

In accordance with certain aspects of the currently presented subject matter, there is provided a method of analyzing an ordered security rule-set comprising a plurality of rules and characterized by at least one extrinsic field. The method enables reducing a number of combinations that needs to be calculated when auditing the rule-set. An extrinsic space corresponding to the at least one extrinsic field is partitioned into equivalence classes (e.g. group-based equivalence classes or rule-based equivalence classes). Rule-based equivalence class is characterized by that the exact same rules apply for all atomic elements of such class. Group-based equivalence class is characterized by that a group of atomic elements appears exactly in the same set of rules.

The equivalence classes can be used for generating a rule-set with reduced number of extrinsic fields. Such generated rule-set is logically equivalent to the original rule-set, however, unlike the original rule-set, all members of each equivalence class are either fully included in a rule or not. In contrast to the original rule-set, in the generated rule set there are no rules that contain a partial subset of a certain equivalence class.

In accordance with certain aspects of the currently presented subject matter, there is provided a method of analyzing an ordered security rule-set comprising a plurality of rules and characterized by at least one extrinsic field, the method comprising: upon specifying atomic elements constituting an extrinsic space corresponding to the at least one extrinsic field, partitioning, by a processor, the extrinsic space into two or more equivalence classes, wherein each atomic element in the extrinsic space belongs to one and only one equivalence class; mapping, by the processor, said equivalence classes over the rule-set; and analyzing, by the processor, the security rule-set using the results of mapping said equivalence classes over the rule-set.

Partitioning into equivalence classes can be provided by mapping each atomic element in the extrinsic space to the rules in which the atomic element appears, and wherein each equivalence class is constituted by one or more atomic elements of said extrinsic space that appear in same rules exactly. Alternatively or additionally, partitioning into equivalence classes can be provided by mapping each atomic element of the extrinsic space over all groups of extrinsic values specified for the rule-set, and wherein each equivalence class is constituted by one or more atomic elements of said extrinsic space that appear in same groups exactly.

The method can further comprise generating, by the processor, a logically equivalent security rule-set specifying the rules with regard to the equivalent classes. Further the method can comprise, responsive to a request related to one or more conditions specified in the rule-set with regard to a given group specified for the rule-set, identifying equivalence classes corresponding to the given group; and analyzing the one or more conditions specified in the logically equivalent rule-set for each of the identified equivalence classes.

In a case when the at least one extrinsic field specifies both extrinsic and non-extrinsic values, the method can further comprise: specifying a first space comprising only extrinsic values specified in the extrinsic field and a second space comprising only non-extrinsic values specified in the extrinsic field; and analyzing the rule-set in regard to the first space independently from analyzing the rule set in regard to the second space.

The at least one extrinsic field can be, for example, a source field, a destination field, a user field, an application field, etc.

In accordance with other aspects of the currently presented subject matter, there is provided an analyzer to analyze an ordered security rule-set comprising a plurality of rules, and characterized by at least one extrinsic field, the analyzer comprising:
a first interface to obtain data specifying atomic elements constituting an extrinsic space corresponding to the at least one extrinsic field; and a processor operatively connected to the first interface to partition the extrinsic space into two or more equivalence classes, wherein each atomic element in the extrinsic space belongs to one and only one equivalence class; to map said equivalence classes over the rule-set; and to analyze the security rule-set using the results of mapping said equivalence classes over the rule.

The processor can be further configured to assign a unique ID to each atomic element in the extrinsic space prior to partitioning the space into equivalence classes.

The processor can be further configured to partition into equivalence classes by mapping each atomic element in the extrinsic space to the rules in which the atomic element appears, and wherein each equivalence class is constituted by one or more atomic elements of said extrinsic space that appear in same rules exactly.

The analyzer can further comprise a second interface operatively coupled to the processor to obtain data specifying groups of values specified in the at least one extrinsic field, wherein the processor to partition into equivalence classes by mapping each atomic element of the extrinsic space over all groups of extrinsic values specified for the rule-set, and wherein each equivalence class is constituted by one or more atomic elements of said extrinsic space that appear in same groups exactly. The processor can be further configured to generate a logically equivalent security rule-set specifying the rules with regard to the equivalent classes; responsive to a request related to one or more conditions specified in the rule-set with regard to a given group specified for the rule-set, to identify equivalence classes corresponding to the given group; and to analyze the one or more conditions specified in the logically equivalent rule-set for each of the identified equivalence classes.

Among advantages of certain embodiments of the presently disclosed subject matter is capability of calculating combinations per equivalence class instead of separate calculating them for each extrinsic value and, thereby, reduced number of combinations that need to be calculated when auditing the rule-set.

BRIEF DESCRIPTION OF THE DRAWINGS

In order to understand the invention and to see how it can be carried out in practice, an embodiment will now be described, by way of non-limiting example only, with reference to the accompanying drawings, in which.

DETAILED DESCRIPTION OF EXEMPLARY EMBODIMENTS

In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "analyzing", "specifying", "generating", "configuring", "searching", "mapping", or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including the rule-set analyzer and/or the processor therein disclosed in the currently presented subject matter.

The operations in accordance with the teachings herein can be performed by a computer specially constructed for the desired purposes or by a general-purpose computer specially configured for the desired purpose by a computer program stored in a non-transitory computer readable storage medium.

Embodiments of the presently disclosed subject matter are not described with reference to any particular programming language. It will be appreciated that a variety of programming languages can be used to implement the teachings of the inventions as described herein.

The term "criterion" used in this patent specification should be expansively construed to include any compound criterion, including, for example, several criteria and/or their logical combinations.

The references cited in the background teach many principles of access control that are applicable to the present invention. Therefore the full contents of these publications are incorporated by reference herein where appropriate for appropriate teachings of additional or alternative details, features and/or technical background.

Figure 1:
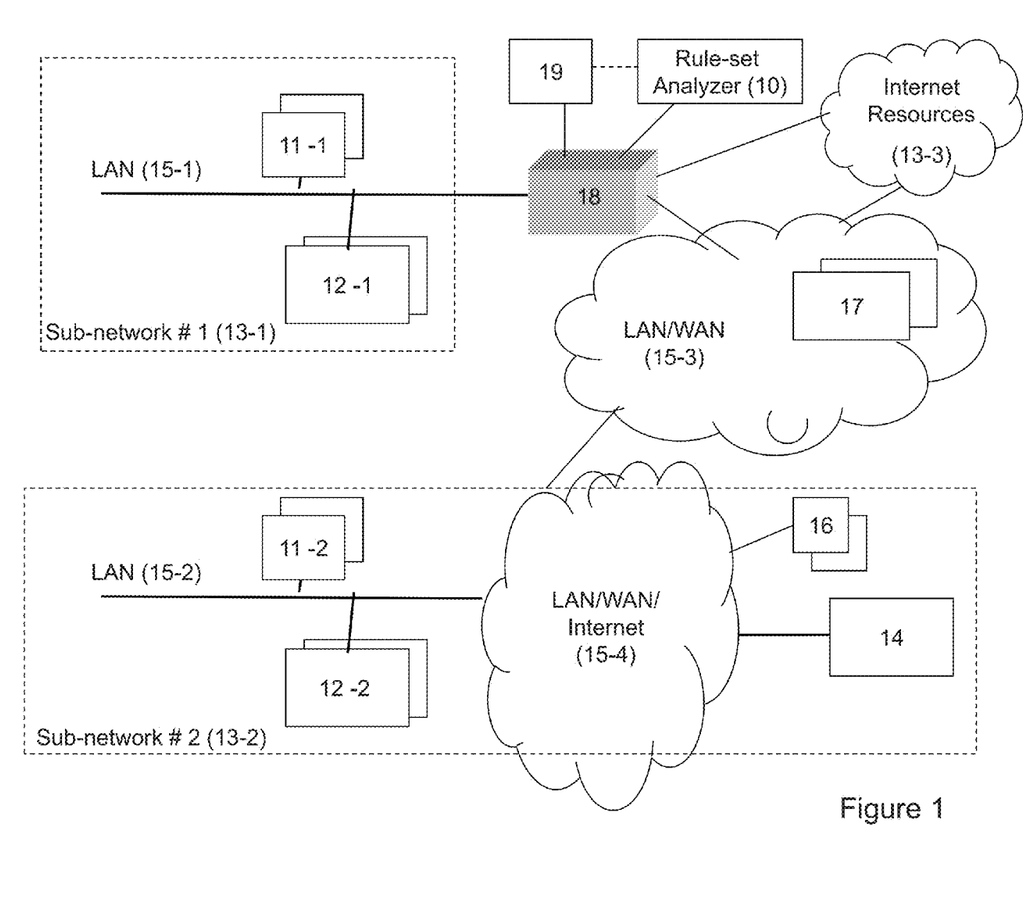
FIG. 1 illustrates a generalized network environment including a rule-set analyzer configured in accordance with certain embodiments of the presently disclosed subject matter.

Bearing the above in mind, attention is drawn to FIG. 1 schematically illustrating an exemplary generalized data network implementing the rule-set analyzer configured in accordance with certain embodiments of the presently disclosed subject matter.

The illustrated data network comprises a plurality of intranet network resources (e.g. workstations 11-1, 11-2, and/or servers 12-1, 12-2, web-based application server 14, resources associated with mobile users 16, etc.) grouped in sub-networks 13-1 and 13-2. The sub-networks, as well as the resources within the sub-networks, can be operatively coupled via one or more local (15-1, 15-2) or wide area (15-3, 15-4) communication networks (including Internet) or combinations thereof. The communication network comprises one or more communication devices 17 (e.g. switches, routers, bridges, etc.) facilitating data transfer and can be private, public or combined. One or more communication networks (typically, private communication networks) can constitute a part of the intranet. The intranet resources (including client based resources, web-based resources, etc.) are predefined as belonging to the intranet. The intranet resources can be grouped in two or more logical groups (sub-networks) in accordance with different criterion. For example, the grouping can be provided in accordance with network architecture (e.g. resources connected by certain LAN) and/or business structure (e.g. resources related to a certain business unit) and/or business function (e.g. resources related to a certain application/business task) and/or level of user's trust and/or level of classified information, etc.

The data network can include also resources, other than intranet, by way of non-limiting example, Internet resources (other than web-based intranet resources); these resources can be grouped, for example, in one or more sub-networks 13-3.

The network resources may be physical or virtual.

A security gateway 18 is operatively coupled to the sub-network 13-1 and controls inbound and outbound traffic related to the sub-network and resources thereof. Similarly, the security gateway 18 or other (not shown) security gateway(s) can control inbound and outbound traffic related to sub-network 13-2 and/or parts thereof (e.g. to a certain server and/or application running on the server). The security gateway can comprise, for example, one or more firewalls or routers with respective load balancers, intrusion detection/prevention systems, VPN devices and/or other equipment facilitating network and/or application security.

The security gateways operate in accordance with one or more rules controlling, at least, inbound and/or outbound traffic with regard to respective resources. These rules (including combinations and/or hierarchies thereof) are referred to hereinafter as a rule-set or rule base. A single rule typically includes several fields (e.g. source (IP address and/or port), destination (IP address and/or port), service type, user, application, etc.), and an action which shall be drawn from the rule when a certain condition with regard to the field values is satisfied. A field of a rule can be characterized by a specified set of values (e.g. a certain IP address, a certain range of TCP ports, a certain range of IP addresses in a LAN defined by a mask, any port, etc.). The action in the rule can specify accepting or denying the respective traffic, authentication, encryption, etc.

Source and/or destination fields can be characterized by IP addresses, ports, by virtual machines (VM) names, Security Groups (SG) names and/or other identifying names. VM names and Security Groups are commonly used in security policies related to virtual environments (e.g. environments provided by VMWare, Amazon and/or other Cloud Infrastructure Providers, etc.).

The rules are organized in a security rule-set corresponding to a specified security policy. Typically, the security rule-set is configured as an ordered list of rules that is processed from the top to the bottom in sequential order. The rules can be organized based on "first-match-wins" principle in which the first rule that matches a given IP packet will determine that packet's fate. Typically, all rules in a rule-set comprise the same fields. Thus, unless specifically stated otherwise, the term "field" in this patent specification is equivalently used for a field characterizing a rule-set and a field comprised in any of the rules of the rule-set.

In addition to controlling traffic in accordance with source, destination and/or services, the security gateway can control traffic in accordance with users, applications and/or other additional fields specified in the rules. Alternatively, the security gateway can provide control of access to certain resources in accordance with, for example, user and/or application independently of control based on source, destination and/or services characteristics of the traffic.

Some values specified in a given field can be combined in groups and a given rule can be specified with regard to the group.

The security rule-set can be associated with one or more data structures accommodating definition of groups (e.g., user groups, security groups, service groups etc.) and/or definitions of virtual machines. Such associated data structures can be configured as a part of the security rule-set or can be implemented as external to the rule-set data structures (e.g. LDAP list, organization structure, virtual machine names, etc.).

The security gateway 18 is operatively connected to a security management block 19. The security management block can be fully or partly integrated with the security gateway or can be implemented in one or more stand-alone servers or integrated with other network resources. The functions of the security management block can include providing a backend for the policy editor GUI, monitoring the operation of the security gateway, storing the rule-set database and associated data structures, reporting, etc. In certain embodiments, the rule-set database and/or associated data structures can be accommodated in the security gateway and/or the management block.

In accordance with certain embodiments of the presently disclosed subject matter, the security gateway 18 and/or the security management block 19 are operatively connected to an analyzer 10 operable to provide the rule-set auditing as further detailed with reference to FIGS. 2-4. The analyzer 10 (referred to hereinafter also as a rule-set analyzer) can be fully or partly integrated with the security gateway and/or the security management block, or can be implemented in one or more stand-alone servers, or fully or partly integrated with other devices (including sub-network resources, communication devices, security devices, etc.). Additionally or alternatively, the rule-set analyzer can provide the required rule-set auditing off-line.

Note that the invention is not bound by the specific architecture described with reference to FIG. 1. Those versed in the art will readily appreciate that the invention is, likewise, applicable to any network architecture facilitating access control to data network resources in accordance with an ordered "first-match-win" based rule-set installed at any suitable security gateway capable of controlling the respective traffic. The security gateway and the analyzer may be standalone network entities, or integrated, fully or partly, with other network entities, including platforms accommodating the protected resources.

One of the common tasks in IT security management is auditing a security rule-set in order to assess how the security rule-set controls access to the resources. For

EXAMPLE

Does the security rule-set block certain risky traffic?
Does the security rule-set allow certain traffic that is needed for business?

By way of non-limiting example, the access control analyses can be provided with the help of network scanning including attempting connection to certain IP addresses and ports that are behind a security gateway with further reporting and analyzing the results.

A different approach is analytical and includes analyzing the security rule-set and determining (without actually sending the packets through the firewall) what decisions the security gateway would make for the traffic in question.

For example, if one wants to determine if the firewall permits connections from IP1 to IP2, one can traverse the rules, top-down, find the 1st rule with IP1 in source and IP2 in destination, and determine the answer according to the action that is defined in that rule.

Such a naïve algorithm would probably be impractical for larger data sets. For example, to analyze connections from 10.0.0.0/8 to 192.168.0.0/16 one would need to analyze 2^(24+16) combinations (and in the case of IPv6, the space is even larger).

Certain solutions have been developed to optimize the analytical approach for a large number of combinations. Non-limiting examples of such analyses are disclosed in U.S. Pat. No. 8,468,113 assigned to the assignee of the present application and incorporated herewith by reference in its entirety.

In certain cases, analyzing the rule-set can be optimized by reducing the number of combinations that needs to be calculated. The optimization can be based on grouping of values specified in a certain field so that analysis can be performed once per group rather multiple times for each discrete value.

Some fields in the rule-set specify by a set of values which can be organized, using their quantitative values, in consistent groups. The term "consistent group" used in this patent specification should be expansively construed to include any group constituted by group members which are all consistently treated by the rule-set. For example IP addresses in source and/or destination fields can be grouped, using their quantitative values, into subnets, wherein all IP addresses within a given subnet are consistently treated by all rules in a respective rule-set. Analyzing source and destination fields for large data sets can be greatly optimized by performing the analysis per subnet rather than per IP.

Other values however, are not suitable for grouping in consistent groups by using their quantitative values. Such values are referred to hereinafter as extrinsic values. A field in a rule-set specifying at least one extrinsic value in at least one rule belonging to the rule-set is referred to hereinafter as an extrinsic field. Extrinsic fields can specify non-numerical values (e.g. user names, application identities, service names, VM names, security group names, virtual network interface (VNIC) cards etc.), numerical values (e.g. in a case of other than sub-net or similar grouping) or a combination of numerical and non-numerical values (e.g. in a case of source and/or destination fields characterized in some rules by numerical values and in another rules by VM names or even together in the same rule, etc.).

Table 1 below illustrates non-limiting example of a rule that comprises user and application fields in addition to such traditional fields as source, destination and port (service). The exemplified rule specifies that Reuven is allowed to access Facebook® from the LAN.

TABLE 1

| Rule Number | User | Source | Destination | Service | Application | Action |
|---|---|---|---|---|---|---|
| 1 | Reuven | LAN | Internet | 80 | Facebook® | Accept |

Tables 2 and 3 illustrate a non-limiting example of a security rule-set. Table 2 illustrates an exemplified rule-set comprising a "user" field. The "user" field in some rules is specified on a group level, such groups further detailed at a username level in the data structure illustrated in Table 3.

TABLE 2

| Rule Number | User Group | Source | Destination | Service | Application | Action |
|---|---|---|---|---|---|---|
| 1 | QA | ... | ... | ... | ... | Drop |
| 2 | R&D | ... | ... | ... | ... | Accept |
| 3 | Any | ... | ... | ... | ... | Drop |

TABLE 3

| User Group | Group Members (users) |
|---|---|
| QA | Sarah |
| R&D | Sarah, John, Emily |
| Any | Ella, Diana, Emily, Sarah John |

Using the user groups as specified in the data structure can be problematic as members of such groups are not necessarily treated consistently by the rule-set. For example, the rule-set illustrated in Tables 2 and 3 applies different rules for the users in the R&D group (John, Sarah). John appears in rules 2 and 3 while Sarah appears in rules 1, 2 and 3. Moreover, the illustrated rule-set applied different actions to John and Sara, as action with regard to Sara is controlled by the 1st rule in the ordered rule-set. Accordingly, the user field in the exemplified rule-set is extrinsic as the respective values are non-suitable for intrinsic grouping into consistent groups.

In accordance with certain embodiments of the presently disclosed subject matter, there is provided a method of analyzing a security rule-set comprising extrinsic fields. The term "extrinsic space corresponding to a given extrinsic field" used in this patent specification should be expansively construed to include a set constituted by all extrinsic values related to the same type (e.g. users, applications, VMs, etc.) specified in respective fields of the rules in a given rule-set. The rule-set can be characterized by N>0 extrinsic spaces, each corresponding to the respective extrinsic field.

Figure 2:
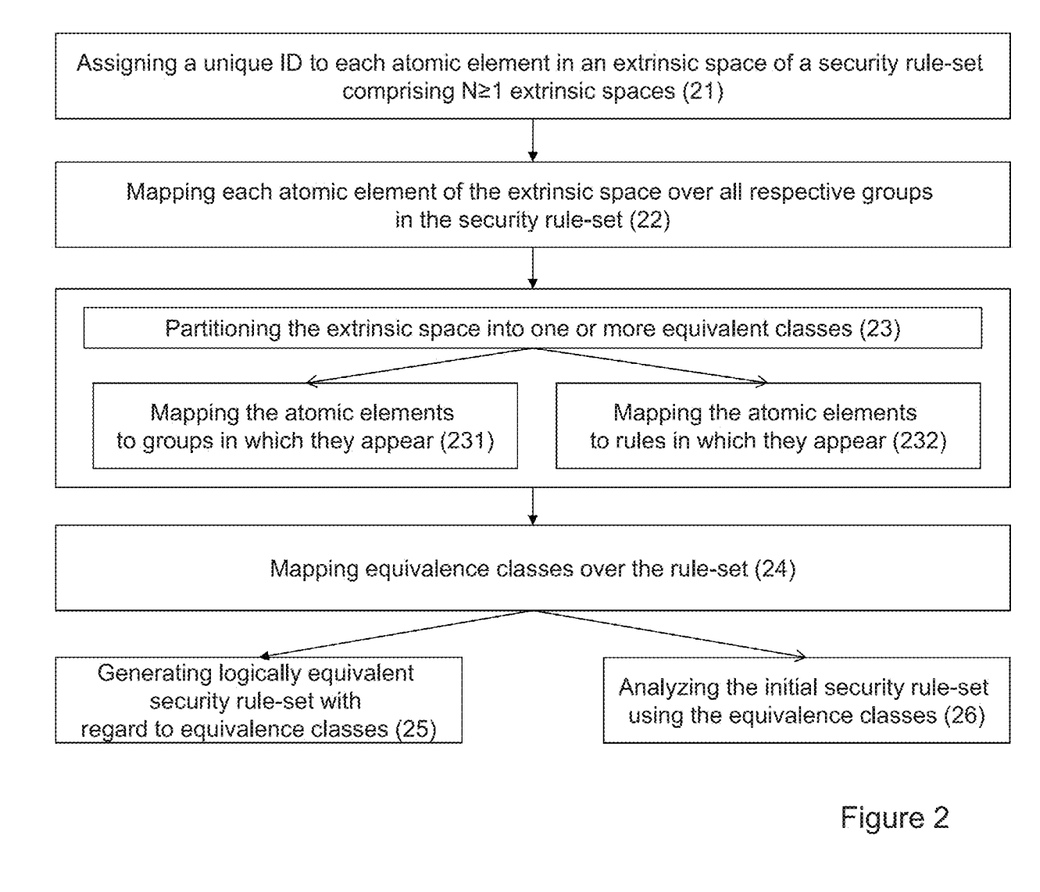
FIG. 2 illustrates a generalized flow diagram of analyzing a rule-set in accordance with certain embodiments of the presently disclosed subject matter.

A generalized flow diagram of analyzing a rule-set in accordance with certain embodiments of the presently disclosed subject matter is illustrated in FIG. 2.

For purpose of illustration only, the following description is provided for a "user" extrinsic space, constituted by the usernames and user group names specified in the rule-set. Those versed in the art will readily appreciate that, likewise, the disclosed subject matter can be applied to other extrinsic fields in the security rule-set.

The analysis can be provided for an entire extrinsic space or only for specific extrinsic values selected in accordance with certain criterion. By way of non-limiting example, if users are authenticated against an external server (e.g. such as LDAP), then analysis can be provided for all usernames that are defined in that server. If the value 'Any User' is used in the rule-set, then the users that are not explicitly mentioned in the rules can also be included in the analyses.

In accordance with certain embodiments of the presently disclosed subject matter, upon obtaining an extrinsic space corresponding to a given extrinsic field, the rule-set analyzer assigns (21) a unique ID to each atomic element in a given extrinsic space constituted by values specified in respective extrinsic field. The specified value is referred to as an "atomic element" if it cannot be broken down into simpler values that may be handled with different actions in the rule set. For example, usernames (namely John, Sarah, Ella, Diana, and Fred) are atomic elements in the "user" extrinsic space illustrated in Tables 2 and 3. The unique ID can be specified in any suitable form as, for example, the value itself (e.g. username), a serial number, etc. The atomic elements and groups thereof can be specified in a separate data structure associated with the rule-set or can be specified inside the rule-set. The operation (21) is not necessary if the extrinsic space is constituted merely by numeric values.

Each atomic element in the given extrinsic space is mapped (22) over all groups specified in one or more data structures associated with the security rule-set, thereby identifying all groups containing the respective atomic element.

The given extrinsic space is further partitioned into equivalence classes (23) such that each atomic element belongs to one and only one equivalence class and, thus, the atomic elements in a given equivalence class constitute a consistent group.

The equivalence classes can be generated by mapping (231) the atomic elements to specified groups of atomic elements. A group of atomic elements in a given extrinsic space that appear in the exactly same set of groups is referred to hereinafter as a "group-based equivalence class".

For example, in the user space, the equivalence function is defined such that two users are equivalent if and only if they belong to the same set of groups exactly:
F(user)=Containing Groups(user)
F(user1)=F(user2)->user1~user2

Table 4 illustrates group-based equivalence classes generated for the non-limiting example of the security rule-set illustrated in Tables 2 and 3.

TABLE 4

| Equivalence Class | Groups | Members |
|---|---|---|
| 1 | R&D, Any | Emily, John |
| 2 | QA, R&D, Any | Sarah |
| 3 | Any | Ella, Diana |

Note that users appearing directly in the rule base (not through a group) and the value 'Any' are considered as groups.

In contrast to the groups originally defined in the security policy when the rule-set may apply different rules for the users of the same group, the exact same rules apply for all users in a group-based equivalence class, i.e. the elements of a given group-based equivalence class constitute a consistent group.

It should also be noted that the original groups and every logical combination of them (union, intersection, complement, etc.) can be represented as a union of the group-based equivalence classes. This enables analysis for any of the original groups, and combination thereof, using the constructed group-based equivalence classes.

For example, R&D can be represented by the union of equivalence classes 1 and 2. Users in R&D excluding QA can be represented by the equivalence class 1.

Alternatively, the equivalence classes can be generated by mapping (232) the atomic elements to rules in which they appear. A group of atomic elements in a given extrinsic space that appear exactly in the same set of rules is referred to hereinafter as a "rule-based equivalence class", the elements of a given rule-based equivalence class constitute a consistent group.

Table 5 illustrates rule-based equivalence classes generated for the non-limiting example of the security rule-set illustrated in Tables 2 and 3.

TABLE 5

| Equivalence Class | Rule Number | Members |
|---|---|---|
| 1 | 2, 3 | John, Emily |
| 2 | 1, 2, 3 | Sarah |
| 3 | 3 | Ella, Diana |

Upon generating the equivalence classes, the rule-set analyzer further provides mapping (24) between the equivalence classes and the rules in the rule-set, thereby determining which equivalence classes are relevant per rule; and generates (25) a new security rule-set with regard to the equivalence classes, the new rule-set being logically equivalent to the initial rule-set (i.e. logic of one rule-set is equivalent to logic of another). The generated security rule-set can be analyzed by calculating combinations per consistent groups (equivalence classes).

Optionally, for further optimization of the rule-set, the operations 21-25 can be recursively applied to other extrinsic fields.

Table 6 illustrates a generated rule-set corresponding to the non-limiting example illustrated in Tables 2-4 (group-based equivalence classes).

TABLE 6

| Number | Equivalence class | Source | Destination | Service | Application | Action |
|---|---|---|---|---|---|---|
| 1 | 2 | ... | ... | ... | ... | Drop |
| 2 | 1, 2 | ... | ... | ... | ... | Accept |
| 3 | 1, 2, 3 | ... | ... | ... | ... | Drop |

The illustrated generated rule-set is logically equivalent to the original rule-set, however, unlike the original rule-set, all members of each equivalence class are either fully included in a rule or not. There are no rules that contain a partial subset of a certain equivalence class in contrast to the original rule-set, where, for example, R&D member, Sarah, appears in rule 1, while the other two R&D members, John and Emily do not.

Thus, the disclosed technique enables calculating combinations per equivalence class instead of calculating them for each user. For example, rather than calculating the combinations for Emily and John separately, the calculation can be provided for the group-based equivalence class number 1 which consists of Emily and John and behaves consistently for them.

The conditions of the original groups can be also calculated by combining equivalence classes. For example, R&D group is combination of group-based equivalence classes 1 and 2.

Likewise, Table 7 illustrates generated rule-set corresponding to the non-limiting example illustrated in Tables 2-3, 5 (rule-based equivalence classes).

TABLE 7

| Number | Equivalence class | Source | Destination | Service | Application | Action |
|---|---|---|---|---|---|---|
| 1 | 2 | ... | ... | ... | ... | Drop |
| 2 | 1, 2 | ... | ... | ... | ... | Accept |
| 3 | 1, 2, 3 | ... | ... | ... | ... | Drop |

Alternatively or additionally, mapping (24) between the equivalence classes and the rules in the rule-set can be used for optimized auditing (26) of the initial rule-set. For example, when answering questions related to a group in a given extrinsic field (e.g. "Is R&D allowed access to Facebook®"?), the rule-set analyzer can identify equivalence classes corresponding to the group and analyze the conditions in the other fields for each of the respective equivalence classes.

Likewise, the analyses can be provided for a group which is not specified in the respective data structure (e.g. a new group not specified in Table 3 and consisting of Sarah and Diana). The rule-set analyzer adds the required group to the respective data structure and generates the equivalence classes in accordance with the amended data structure. Table 8 illustrates the amended data structure and Table 9 illustrates the respectively generated equivalence classes.

TABLE 8

| Group | Group Members (users) |
|---|---|
| QA | Sarah |
| R&D | Sarah, John, Emily |

TABLE 8-continued

| Group | Group Members (users) |
|---|---|
| Any | Ella, Diana, Emily, Sarah John |
| Group 1 | Sarah, Diana |

TABLE 9

| Equivalence Class | Groups | Members |
|---|---|---|
| 1 | R&D, Any | Emily, John |
| 2 | QA, R&D, Any, New Group | Sarah |
| 3 | Any | Ella |
| 4 | Any, New Group | Diana |

Certain rule sets can comprise at least one extrinsic field specifying both extrinsic and non-extrinsic value in different rules and/or in the same rule. A non-limiting example of such rule-set is illustrated in Table 10.

TABLE 10

| | Source | Destination | Service | Action |
|---|---|---|---|---|
| Rule 1 | Any VM Any IP address | 10.0.0.0/8 PCI-Servers | Any | Drop |
| Rule 2 | Any IP address | web-server | HTTP | Accept |
| Rule 3 | Web-Servers | DNS-Servers | DNS | Accept |

In contrast to a regular network object, the destination "web-server" is characterized by a name representing a virtual machine and not by an IP address. Likewise, SG names "PCI-Servers", "Web-Servers" and "DNS-Servers" are characterized by names of security groups constituted by certain virtual machines.

Source field in rule 1 specifies extrinsic values (Any VM) and non-extrinsic values (Any IP address). Destination field in rule 1 specifies SG name "PCI Servers" (extrinsic values) and IP addresses in IP subnet (non-extrinsic values).

Furthermore, in the example illustrated in Table 10, the destination field specifies different types of extrinsic values and, accordingly, specifies "SG names" extrinsic space and "VM names" extrinsic space.

In accordance with certain embodiments of the currently presented subject matter, in a case of an extrinsic field specifying both extrinsic and non-extrinsic values, the analyzer divides the set of values specified by such field into two spaces: a first space constituted by all extrinsic values specified in the field and a second space constituted by all non-extrinsic values specified in the field. The first space can further comprise a plurality of extrinsic spaces, each specified separately for a certain type of extrinsic values. The analyzer generates equivalence classes separately for each extrinsic space comprised in the first space and provides mapping between the equivalence classes and the rules in the rule-set in a manner detailed with reference to FIG. 2. The analyzer further provides rule-set analyses separately for the first space and the second space (assuming that the spaces are not overlapping).

By way of non-limiting example, the first space of the source and the destination fields in Table 10 comprise "VM names" extrinsic space and "SG names" extrinsic space. The equivalence classes can be generated separately for each extrinsic space and mapping between the equivalence classes and the rules in the rule-set can be also provided separately for each of the extrinsic spaces.

Optionally, some of the extrinsic spaces can be combined into one space. For example, "VM names" extrinsic space and "SG names" extrinsic space can be combined in a common extrinsic space by translating SG names into respective VM names and combining with VM names specified in "VM names" extrinsic space.

Optionally, some extrinsic spaces can be transformed into non-extrinsic spaces. For example, VM names and SG names can be translated into corresponding IP addresses.

However, the approach of translating the VM names (and/or SG names) into corresponding IP addresses and further observing the respective destination IP addresses in the packets may not always work for analysis purposes since the IP address of virtual machines (e.g. web-servers) may be unknown at the time of the analysis.

Figure 3:
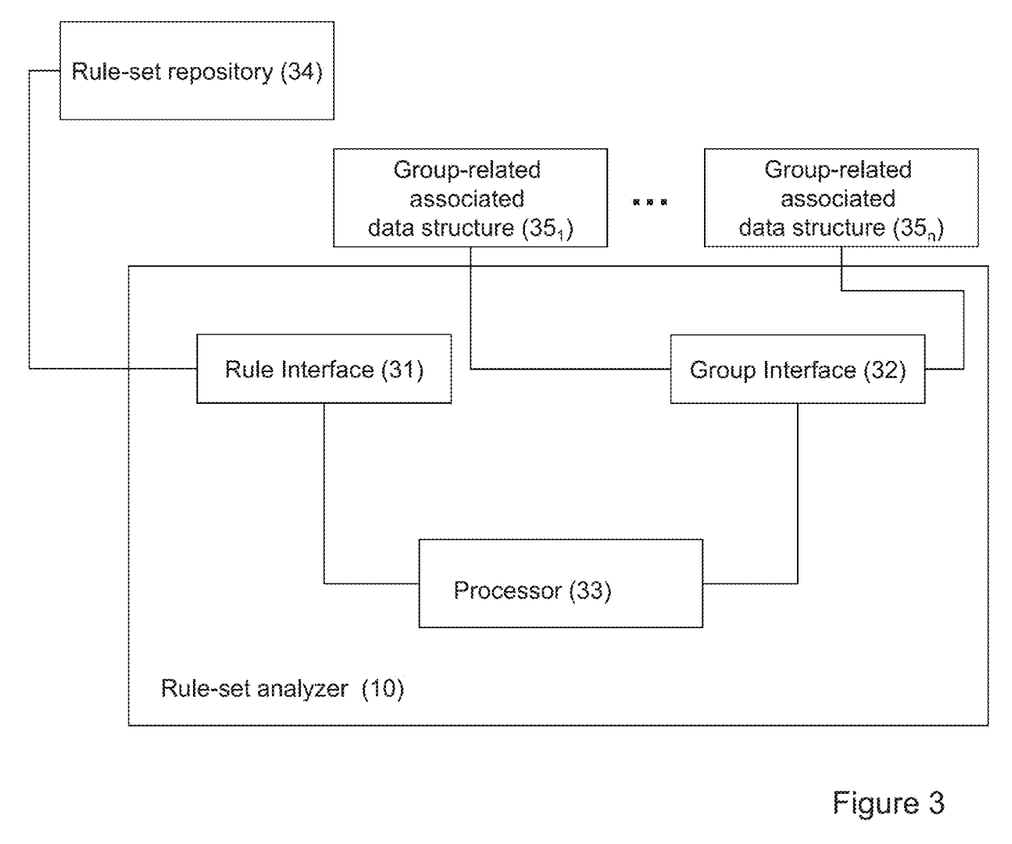
FIG. 3 illustrates a generalized functional block diagram of a rule-set analyzer in accordance with certain embodiments of the presently disclosed subject matter.

Referring to FIG. 3, there is illustrated a generalized block-diagram of the rule-set analyzer in accordance with certain embodiments of the presently disclosed subject matter. The rule-set analyzer (10) can be implemented as a standalone platform or integrated, fully or partly, with other network resources (e.g. firewall or other security gateway, security management module, sniffer, switch, application servers, etc.). The rule-set analyzer comprises a processor (33) operatively coupled to a first interface (31) and a second interface (32). The first interface (referred to hereinafter also as a rule interface) is configured to obtain rules from a rule-set repository (34) and to forward the rules and/or derivatives thereof to the processor. The second interface (referred to hereinafter also as a group interface) is configured to obtain specification of groups of values specified for the rule-set (e.g. to receive group specifications from one or more associated group-related data structures ($35_1$-$35_k$). The processor 33 is configured to provide necessary processing of the obtained rules and group specifications, to generate a logically equivalent rule-set in accordance with operations detailed with reference to FIGS. 1-3, to analyze the rule-set and/or to forward, if necessary, the generated rule-set to the security gateway and/or for accommodation in one or more data repositories (not shown) operatively coupled to the processor.

Those skilled in the art will readily appreciate that the presently disclosed subject matter is not bound by the configuration of FIG. 3; equivalent and/or modified functionality can be consolidated or divided in another manner and can be implemented in software, firmware, hardware, or any appropriate combination thereof. Those skilled in the art will also readily appreciate that the data repositories can be consolidated or divided in other manner; some of these databases can be shared with other systems or be provided by other systems, including $3^{rd}$ party equipment.

It is to be understood that the invention is not limited in its application to the details set forth in the description contained herein or illustrated in the drawings. The invention is capable of other embodiments and of being practiced and carried out in various ways. It should be noted that the invention is not bound by the specific algorithm of processing or specific structure. Those versed in the art will readily appreciate that the invention is, likewise, applicable to any other processing or presentation with equivalent and/or modified functionality which can be consolidated or divided in another manner.

It will also be understood that the invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of analyzing an ordered security rule-set comprising a plurality of rules and characterized by at least one extrinsic field specifying both extrinsic and non-extrinsic values, the method comprising:
   dividing the values specified by the at least one extrinsic field into a first space constituted by all extrinsic values specified in the at least one extrinsic field and a second space constituted by all non-extrinsic values specified in the at least one extrinsic field;
   defining in the first space at least one extrinsic space comprising extrinsic values of the same type;
   upon specifying atomic elements constituting the at least one extrinsic space, partitioning, by a processor, the at least one extrinsic space into two or more equivalence classes, wherein each atomic element in the at least one extrinsic space belongs to one and only one equivalence class, and wherein partitioning into equivalence classes is provided by mapping each atomic element of the at least one extrinsic space over all groups of extrinsic values specified for the security rule-set, each equivalence class constituted by one or more atomic elements of the at least one extrinsic space that appear in same groups exactly;
   mapping, by the processor, said equivalence classes over the security rule-set;
   analyzing, by the processor, the security rule-set using the results of mapping said equivalence classes over the security rule-set, wherein analyzing the security rule-set in regard to the first space is provided independently from analyzing the security rule-set in regard to the second space; and
   using the results of analyzing to generate, by the processor, a logically equivalent security rule-set specifying the rules in regard to the equivalent classes, wherein the logically equivalent security rule-set is usable in operation of a security gateway to control at least one of (i) inbound and outbound traffic related to a network and (ii) access to network resources.

2. The method of claim 1 further comprising assigning a unique ID to each atomic element in the extrinsic space prior to partitioning the at least one extrinsic space into equivalence classes.

3. The method of claim 1 further comprising:
   responsive to a request related to one or more conditions specified in the security rule-set with regard to a given group specified for the security rule-set, identifying equivalence classes corresponding to the given group; and
   analyzing the one or more conditions specified in the logically equivalent rule-set for each of the identified equivalence classes.

4. The method of claim 1, wherein the at least one extrinsic field is selected from a group constituted by a user field and an application field.

5. The method of claim 1, wherein the at least one extrinsic field is selected from a group constituted by a source field and a destination field, and the specified extrinsic values are selected from a group constituted by virtual machine names and security group names.

6. An analyzer to analyze an ordered security rule-set comprising a plurality of rules, and characterized by at least one extrinsic field specifying both extrinsic and non-extrinsic values, the analyzer comprising:
- a first interface to obtain data specifying a first space constituted by all extrinsic values specified in the at least one extrinsic field, data specifying a second space constituted by all non-extrinsic values specified in the at least one extrinsic field, and data specifying atomic elements constituting an extrinsic space defined in the first space and comprising extrinsic values of the same type;
- a second interface to obtain data specifying groups of extrinsic values specified to the security rule-set; and
- a processor operatively connected to the first interface and the second interface, the processor:
  - to partition the extrinsic space into two or more equivalence classes by mapping each atomic element of the extrinsic space over all groups of extrinsic values specified to the security rule-set, wherein each equivalence class is constituted by one or more atomic elements of the extrinsic space that appear in same groups exactly, and wherein each atomic element in the extrinsic space belongs to one and only one equivalence class;
  - to map said equivalence classes over the security rule-set;
  - to analyze the security rule-set using the results of mapping said equivalence classes over the rule-set, wherein analyzing the security rule-set in regard to the first space is provided independently from analyzing the security rule-set in regard to the second space; and
  - to generate, using the results of analyzing the security rule-set, a logically equivalent security rule-set specifying the rules in regard to the equivalence classes, wherein the logically equivalent security rule-set is usable in operation of a security gateway to control at least one of (i) inbound and outbound traffic related to a network and (ii) access to network resources.

7. The analyzer of claim 6, wherein the extrinsic field specifies non-numeric extrinsic values, the processor further to assign a unique ID to each atomic element in the extrinsic space prior to partitioning the space into equivalence classes.

8. The analyzer of claim 6, wherein the processor further:
- to generate a logically equivalent security rule-set specifying the rules with regard to the equivalence classes; responsive to a request related to one or more conditions specified in the security rule-set with regard to a given group specified for the security rule-set, to identify equivalence classes corresponding to the given group; and to analyze the one or more conditions specified in the logically equivalent security rule-set for each of the identified equivalence classes.

9. The analyzer of claim 6, wherein at least one extrinsic field is selected from a group constituted by a user field and an application field.

10. The analyzer of claim 6, wherein the at least one extrinsic field is selected from a group constituted by a source field and a destination field, and the specified extrinsic values are selected from a group constituted by virtual machine names and security group names.

11. A non-transitory computer readable medium storing a computer readable program executable by a computer for causing the computer to perform a method of analyzing an ordered security rule-set comprising a plurality of rules and characterized by at least one extrinsic field specifying both extrinsic and non-extrinsic values, the method comprising:
- dividing the values specified by the at least one extrinsic field into a first space constituted by all extrinsic values specified in the at least one extrinsic field and a second space constituted by all non-extrinsic values specified in the at least one extrinsic field;
- defining in the first space at least one extrinsic space comprising extrinsic values of the same type;
- upon specifying atomic elements constituting the at least one extrinsic space, partitioning the extrinsic space into two or more equivalence classes, wherein each atomic element in the extrinsic space belongs to one and only one equivalence class, and wherein partitioning into equivalence classes is provided by mapping each atomic element of the at least one extrinsic space over all groups of extrinsic values specified for the security rule-set, each equivalence class constituted by one or more atomic elements of the at least one extrinsic space that appear in same groups exactly;
- mapping said equivalence classes over the rule-set;
- analyzing the security rule-set using the results of mapping said equivalence classes over the rule-set, wherein analyzing the security rule-set in regard to the first space is provided independently from analyzing the security rule-set in regard to the second space; and
- using the results of analyzing to generate a logically equivalent security rule-set specifying the rules in regard to the equivalent classes, wherein the logically equivalent security rule-set is usable in operation of a security gateway to control at least one of (i) inbound and outbound traffic related to a network and (ii) access to network resources.

12. A computer program product comprising a non-transitory computer readable medium storing computer readable program code embodied therein for causing a computer to perform a method of analyzing an ordered security rule-set comprising a plurality of rules and characterized by at least one extrinsic field specifying both extrinsic and non-extrinsic values, the method comprising:
- dividing the values specified by the at least one extrinsic field into a first space constituted by all extrinsic values specified in the at least one extrinsic field and a second space constituted by all non-extrinsic values specified in the at least one extrinsic field;
- defining in the first space at least one extrinsic space comprising extrinsic values of the same type;
- upon specifying atomic elements constituting the at least one extrinsic space, partitioning the extrinsic space into two or more equivalence classes, wherein each atomic element in the extrinsic space belongs to one and only one equivalence class, and wherein partitioning into equivalence classes is provided by mapping each atomic element of the at least one extrinsic space over all groups of extrinsic values specified for the security rule-set, each equivalence class constituted by one or more atomic elements of the at least one extrinsic space that appear in same groups exactly;
- mapping said equivalence classes over the rule-set;
- analyzing the security rule-set using the results of mapping said equivalence classes over the rule-set, wherein analyzing the security rule-set in regard to the first space is provided independently from analyzing the security rule-set in regard to the second space; and
- using the results of analyzing to generate a logically equivalent security rule-set specifying the rules in regard to the equivalent classes, wherein the logically equivalent security rule-set is usable in operation of a security gateway to control at least one of (i) inbound and outbound traffic related to a network and (ii) access to network resources.

* * * * *